Nov. 27, 1962   B. J. TRAVIS   3,065,527
PIPE TOOL
Filed Nov. 12, 1959   4 Sheets-Sheet 1
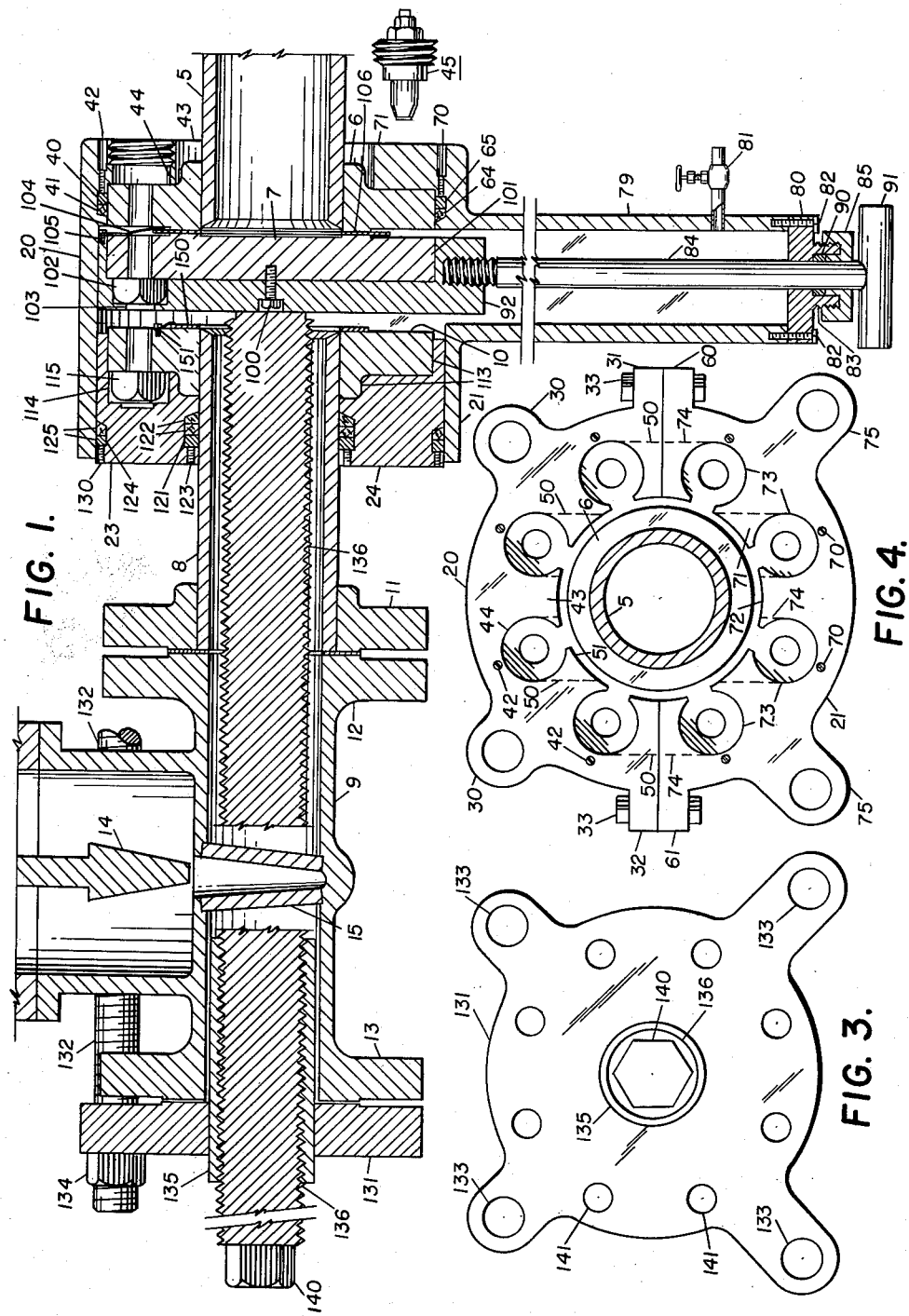

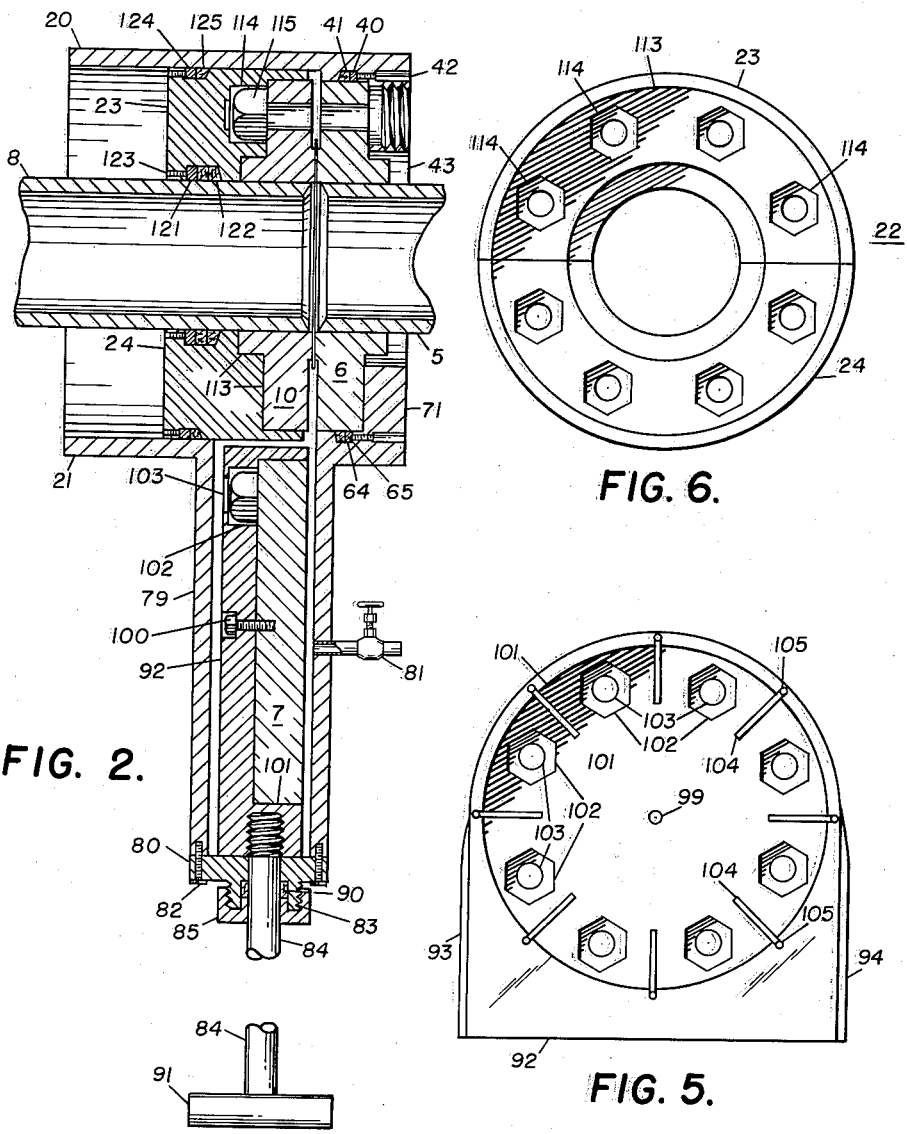

Nov. 27, 1962  B. J. TRAVIS  3,065,527
PIPE TOOL

Filed Nov. 12, 1959  4 Sheets-Sheet 4

United States Patent Office 3,065,527
Patented Nov. 27, 1962

3,065,527
PIPE TOOL
Bobby J. Travis, Vidor, Tex., assignor to Socony Mobil Oil Company, Inc., a corporation of New York
Filed Nov. 12, 1959, Ser. No. 852,429
8 Claims. (Cl. 29—213)

This invention generally relates to pipe tools and specifically relates to a tool which may be employed to remove a blind flange from the end of a pipe and replace the blind flange with a spool and valve while the pipe is under pressure.

In many instances, piping systems have particular pipes or branches which are terminated by or closed off by blind flanges. When such systems are to be extended or modified, it may be necessary that the blind flange on the end of the existing pipe be removed and replaced by a spool and valve. Where the piping system is under a gas or fluid pressure, it has been required in the past that the system be temporarily shut down or that there be a valve in the pipe which may be closed to relieve the pressure on the blind flange while it is being removed and replaced.

It is an object of this invention to provide a pipe tool. It is another object of this invention to provide a pipe tool which may be employed for the purpose of removing a blind flange from the end of a pipe and replacing the blind flange with a spool and valve arrangement. It is a further object of this invention to provide a pipe tool which may be used to replace a blind flange on the end of a pipe with a spool and valve arrangement without shutting off the pressure in the pipe on which the blind flange is installed.

In the drawings:

FIGURE 1 is a cross-sectional view of one embodiment of the invention showing it in association with both a pipe closed by a blind flange and the spool and valve arrangement which replaces the blind flange;

FIGURE 2 is a fragmentary cross-sectional view similar to FIGURE 1 showing a step in the operation of the invention at which the blind flange has been disconnected and retracted from the pipe and a spool and valve arrangement is in position to be attached to the pipe;

FIGURE 3 is an end view of the apparatus of FIGURE 1 illustrating only the jack plate and its associated sleeve together with the compression rod;

FIGURE 4 is an end view of the apparatus of FIGURE 1 showing the existing pipe in section and the end of the split-cylinder assembled on the pipe;

FIGURE 5 is a plan view of the blind flange plate only;

FIGURE 6 is a view of one end of the split-cylinder portion of the invention;

Figure 7:
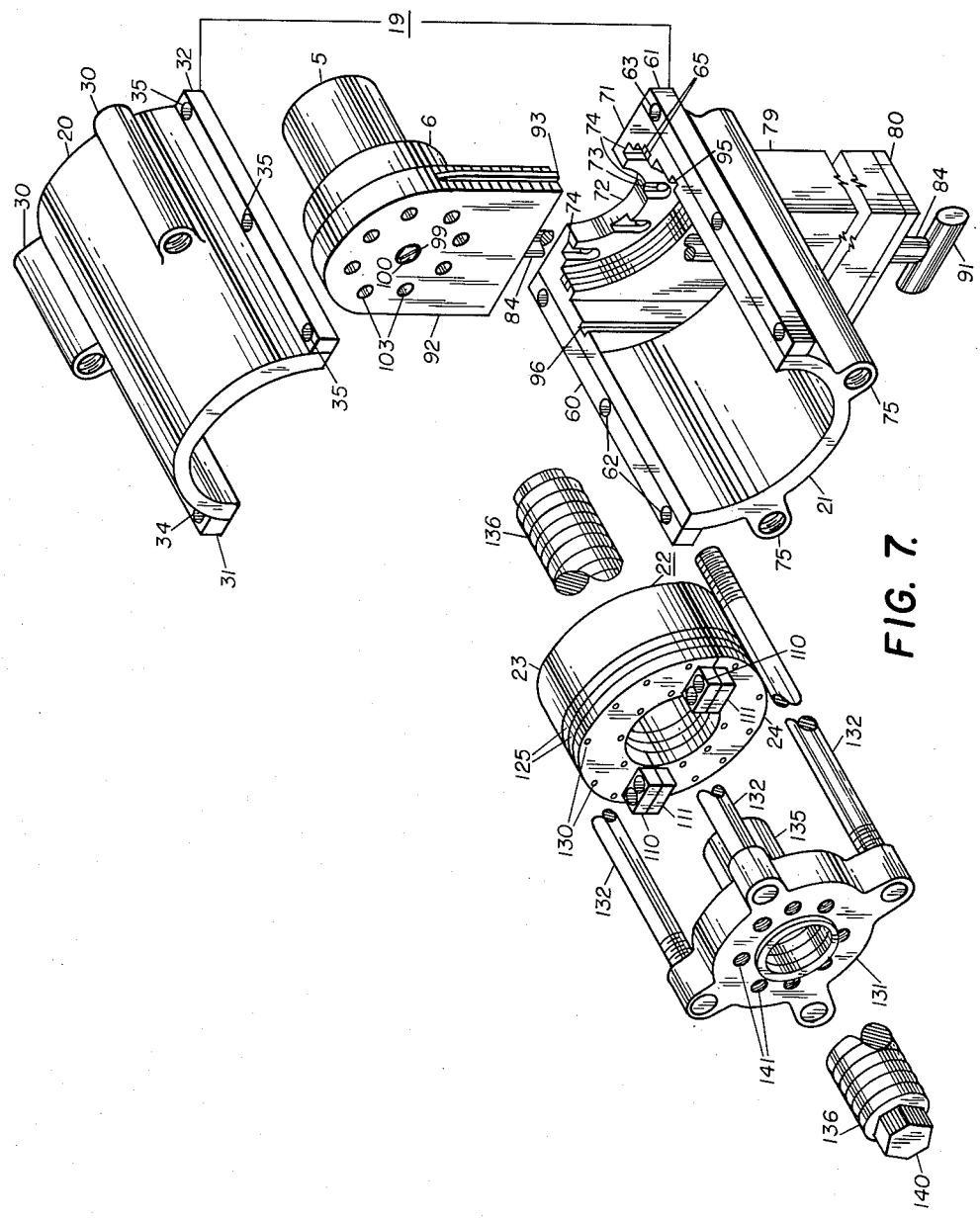
FIGURE 7 is an exploded view in perspective of the embodiment of the apparatus illustrated in FIGURE 1 excluding, however, the valve and spool arrangement.

Referring to the drawings, pipe 5 is provided with a flange 6 to which is secured a blind flange 7. Pipe 5 is part of an existing piping system which may be under fluid or gas pressure and consequently forms no part of the invention but rather is the structure on which the device of the invention is to be used. Spool 8 and valve 9 are secured together to form the spool and valve arrangement which is to be secured to pipe 5 subsequent to removal of blind flange 7. Spool 8 is provided with flanges 10 and 11. Valve 9 is provided with flanges 12 and 13, valve disk 14, and valve seat 15. Flanges 11 and 12 are secured together by bolts, though the bolts are not shown in order to simplify the drawings. The device of the invention is employed to carry out the removal of the blind flange and installation of the spool and valve arrangement.

Cylinder 19, comprising upper half-cylinder 20 and lower half-cylinder 21 which are assembled aver flanges 6 and 7, together with piston 22, which is split into upper half 23 and lower half 24, make up structure that forms a pressure-tight chamber at the end of pipe 5 in which the interchange operation is carried out.

Upper half-cylinder 20 is provided with lugs 30 positioned along the outer surface of the half-cylinder such that their longitudinal axes are parallel to the longitudinal axis of the half-cylinder. In construction, the lugs may be formed integral with the half-cylinder or may be constructed separately and secured by any satisfactory means to the outer surface of the half-cylinder. The lugs are substantially cylindrical in shape and internally threaded throughout their entire length. They are equally spaced from the sides of the half-cylinder and located approximately 90° apart. The function of the lugs will be described hereinafter in connection with the description of the operation of the invention. Upper half-cylinder 20 is provided with flanges 31 and 32 which are formed integral with the half-cylinder and function to permit the upper half-cylinder to be secured to lower half-cylinder 21. Securing the half-cylinders together is accomplished by bolts 33, as shown in FIGURE 4, which pass through bolt holes 34 in flanges 31 and bolt holes 35 in flange 32. Upper half-cylinder 20 is provided with an internal slot 40 into which is fitted a half-circular packing 41. A plurality of set screws 42 are provided in the end of half-cylinder 20. Packing 41 serves to effect a seal with flange 6 and is urged into contact with and maintained in contact with the flange by means of set screws 42. Packing 41 may be any form of resilient material satisfactory for the temperatures and pressures involved. The packing is in the form of a split ring with a rigid backing for contact with set screws 42. A metal ring spacer may be used next to the set screws to insure most effective expansion of the packing. The end of half-cylinder 20 containing set screws 42 is provided with an inwardly extending flange 43. Holes 44 are formed in flange 43 to permit the removal of bolts which are temporarily used to secure blind flange 7 to flange 6 during a step in the operation which will be explained. Holes 44 are internally threaded in order that they may receive plugs 45 which are inserted into the holes subsequent to the removal of the bolts for purposes hereinafter described. Flange 43 is provided with internal vertical slots 50 which are of the same width as the diameter of holes 44. Slots 50 provide clearance for the heads of the bolts temporarily holding flanges 6 and 7 together. Slots 50 facilitate sliding half-cylinder 20 onto flange 6. Half-circular opening 51 is formed in flange 43 adjacent to holes 44 in order that in operating position the half-cylinder will fit around pipe 5.

Lower half-cylinder 21 cooperates with upper half-cylinder 20 to form a cylindrical enclosure. Formed on lower half-cylinder 21 are flanges 60 and 61 which are provided with bolt holes 62 and 63, respectively. Flanges 60 and 61 permit the securing of upper half-cylinder 20 to lower half-cylinder 21. When assembled, flange 31 and flange 60 are secured together and flange 32 is secured to flange 61. An internal slot 64 is formed within half-cylinder 21 to receive half-circular packing 65 which functions to effect a seal between the lower half of flange 6 and half-cylinder 21. Slot 40 and packing 41 join slot 64 and packing 65 to form a continuous slot and seal within cylinder 19 around flange 6. Packing 65 is constructed in the same form as packing 41. Set screws 70 are installed in the end of half-cylinder 21 so that packing 65 may be urged into contact with flange 6. An internally extending flange 71 is formed on the end of half-cylinder 21 and provided with a half-circular opening 72 in order that the flange may fit around the lower half of pipe 5. Extending through flange 71 are a plurality of holes 73 through which bolts temporarily holding flanges 6 and 7 together may be removed from flange 6, as hereinafter described. Flange 71 is provided with internal slots 74 which are of the same width as the diameter of holes 73 to facilitate sliding half-cylinder 21 onto flange 6. The slots provide clearance for the heads of the temporary bolts. Flanges 43 and 71 join to form a continuous flange around the end of the cylinder. Formed on the outer surface of half-cylinder 21 are lugs 75 whose longitudinal axes lie parallel to the longitudinal axis of the half-cylinder. These lugs are substantially cylindrical in form and may be constructed separately or formed integral with half-cylinder 21. The lugs are internally threaded and are equally spaced apart from flanges 60 and 61 and are spaced approximately 90° from each other. The function of the lugs will be explained hereinafter. Connected to and opening into half-cylinder 21 is a box-shaped pocket or receiving chamber 79 which is closed at its lower end by plate 80 which is secured to the pocket 79 by bolts 82. During construction, pocket 79 may be cast integral with half-cylinder 21 or it may be constructed separately and secured by such means as welding to the half-cylinder. A gasket may be provided between pocket 79 and plate 80 to prevent leakage from the pocket around the plate. Secured through a wall of pocket 79 is a bleed valve 81.

Formed on the lower surface of and extending downwardly from plate 80 is an externally threaded cylindrical flange 83. A retracting rod 84 is positioned through plate 80 and flange 83 extending into pocket 79. An internally threaded nut 85 is connected to flange 83 and is closely fitted around rod 84 to assist in maintaining the alignment of the rod and to maintain packing 90 in place to prevent leakage from the inside of the pocket outwardly around the rod. Secured to the lower end of rod 84 is a handle 91. Threadedly connected to the upper end of rod 84 is blind-flange plate 92. Plate 82 functions to hold and retract blind flange 7 downwardly into pocket 79 in order to get the flange out of the way and make it possible to secure the spool and valve arrangement to flange 6. The configuration of the upper end of plate 92 is half-circular, while the lower end of the plate is provided with two 90° corners. The sides of the plate are parallel to each other. The sides of the plate are provided with integral, elongated keys 93 and 94 which slide in keyways or slots 95 and 96, respectively, provided along the inside surfaces of the sides of pocket 79 as shown in FIGURE 7. The keys on plate 92 and keyways within pocket 79 maintain the plate in a position normal to the longitudinal axis of cylinder 19 and guide the plate during upward and downward movement within the pocket. Plate 92 is provided with a hole 99 into which fits a cap screw 100 at the center of the half-circular upper end of the plate for securing the plate to blind flange 7. Cut into the plate is a circular recess 101, the center of which is coincident with the center line of hole 99. Recess 101 is of such a diameter and depth that plate 92 will fit snugly over blind flange 7. Also formed within plate 92 are a plurality of hexagon-shaped recesses 102 which open into recess 101 and are equally distant from the center line of hole 99 and equidistant from each other. Opening from the opposite face of plate 92 into hexagon recesses 102 are holes 103. The positions of recesses 102 are such that they will receive the nuts placed on the bolts used to temporarily hold flanges 6 and 7 together, as explained hereinafter. Holes 103 are provided so that the ends of these temporary bolts extending beyond the nuts may pass through the plate. Secured near the periphery of plate 92 on the face of the plate containing recess 101 are a plurality of spring steel fingers 104 which are secured to the plate by screws 105. Fingers 104 extend inwardly toward the center of the plate so that they will grasp a gasket 106 between blind flange 7 and flange 6 and permit the gasket to be removed from flange 6 coincident with the removal of blind flange 7.

Piston 22, as previously mentioned, is a split-type piston made up of an upper half 23 and a lower half 24. Upper half 23 is provided with flanges 110, and lower half 24 is provided with flanges 111. Bolts, not shown, are secured through flanges 110 and 111 to hold the upper and lower halves of the piston together. One face of the piston, as shown in FIGURES 1, 2, and 6, is provided with a stepped recess 113 in order that the piston may fit around flange 10 on spool 8. The specific shape of recess 113 may be varied to fit spool flanges of other configurations. Opening into recess 113 are a plurality of hexagon-shaped recesses 114 provided in the piston. Recesses 114 are equally spaced apart from each other and are all spaced equidistant from the axis of the piston. Recesses 114 are employed to hold hexagon-shaped nuts 115 which fit on the bolts which are inserted to hold spool 8 to flange 6. Piston 23 is provided with internal slot 121 which is adapted to receive packing 122. Since piston 23 is a split-type of piston comprising upper and lower halves, it is necessary that packing 122 be a split-ring type of packing, half of which fits into recess 121 in upper half 23 and the other half of which fits into recess 121 in lower half 24. Piston 22 is provided with a plurality of set screws 123 which are used to urge packing 122 into sealed relationship with spool 8 around which the piston is installed during operation of the invention. To insure that the set screws will properly seat the packing, the packing should be provided with a hard face or a metal spacer should be employed for direct contact with the ends of the set screws. The external surface of piston 22 is provided with a slot 124 which contains packing 125. Packing 125 is a split-ring type of packing, half of which fits around upper half 23 and the other half of which fits around lower half 24 of the piston. Packing 125 should, as with packing 122, have a hard face or a metal spacer ring for set screw contact. Packing 125 serves to provide a seal between the piston and the internal surface of cylinder 19. A plurality of set screws 130 are provided in piston 22 to enable packing 125 to be forced into sealed relationship with the internal surface of cylinder 19.

Jack plate 131 is secured to cylinder 19 by means of a plurality of tension rods 132. Each of the tension rods 132, which are externally threaded, is fitted at one end into lugs 30 and 75 on cylinder 19, and at the other ends pass through holes 133 in the jack plate. The jack plate is held on the tension rods by means of nuts 134 which are threaded onto the other ends of the tension rods. Jack plate 131 has secured through it an internally threaded sleeve 135 which is adapted to receive externally threaded compression rod 136. Compression rod 136 is provided with a hexagon-shaped head 140 to facilitate rotation of the rod in the sleeve by a wrench or similar tool. Jack plate 131 is provided with a plurality of holes 141 which are equally spaced apart from each other and equally spaced from the axis or center of the jack plate. Holes 141 are so positioned that they will register with similar holes in the flange 13 on valve 9 in order that the jack plate may be bolted to the flange of the valve. For purposes of simplicity of the drawings, bolts connecting jack plate 131 to the flange on valve 9 are not shown; however, it is to be understood that in the operation of the device, it is necessary to temporarily secure the jack plate to the flange of the valve.

Figure 9:
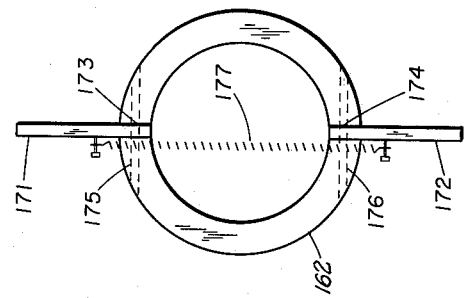
FIGURE 9 is an end view of a portion of the apparatus illustrated in FIGURE 8 showing only the cleaning blades in expanded position and the supporting structure for the blades.
Figure 8:
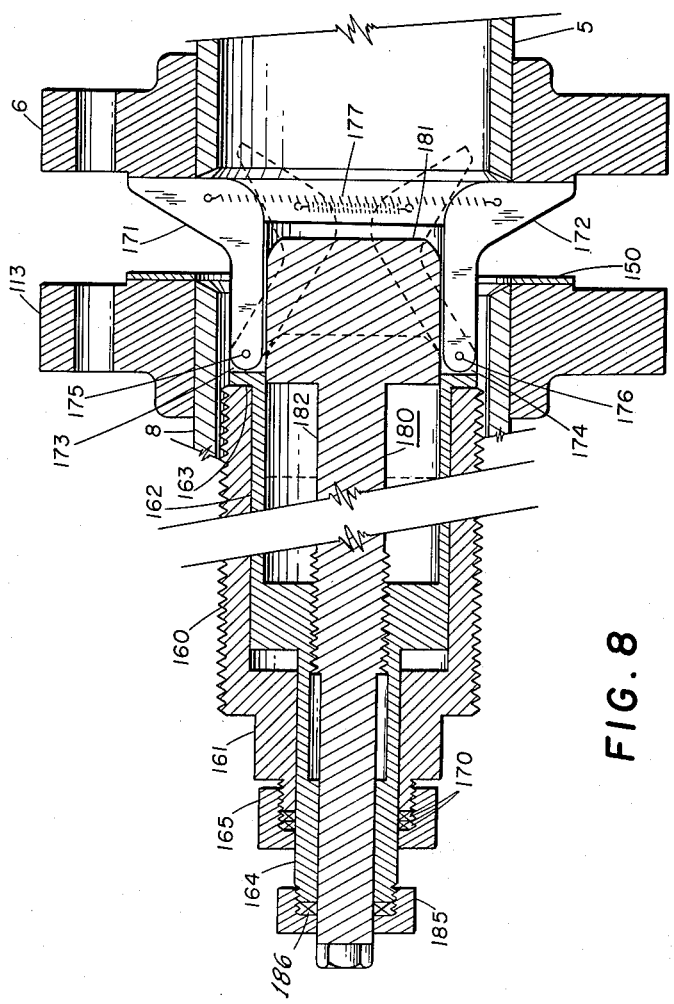
FIGURE 8 is a partial view in cross section of further apparatus of the invention which is employed with the device of FIGURES 1–7 for the purpose of cleaning a flange face.

Illustrated in FIGURES 8 and 9 is a further device of the invention which is employed in conjunction with the apparatus shown in FIGURES 1 through 7 for the purpose of cleaning off old gasket material from the face of flange 6. A clean surface on the face of flange 6 is desirable to insure proper contact between the face of the flange and gasket 150. In order to better show the details, the scale used for FIGURES 8 and 9 has been slightly enlarged over that used for FIGURES 1 through 7. By way of simplification of FIGURE 8, only a portion of pipe 5 and a portion of spool 8, together with flanges 6 and 113, have been illustrated. Referring to FIGURE 8, rod 160 is an elongated, hollow, tubular member which is threaded externally over substantially its entire length and so sized that it may be inserted through valve 9 and spool 8 in the same manner as compression rod 136. Inasmuch as rod 160 occupies, at a particular stage in the operation of the invention as will be explained hereinafter, the same position as compression rod 136, the thread design of rod 160 and its length should be the same as that of the compression rod. Rod 160 is provided with a portion of reduced diameter 161 at its outward end which is hexagon in shape to facilitate the rotation of the rod by a wrench or similar tool. Positioned within rod 160 and movable relative to the rod is a sleeve 162 which is provided with an external shoulder 163 against which the inward end of rod 160 abuts. Portion 164 of sleeve 162 is of reduced diameter and extends through the outward end of rod 160. A packing nut 165 is threaded to rod 160 around reduced portion 164 of sleeve 162. Packing 170 is positioned within packing nut 165 around reduced portion 164 to prevent leakage. Secured to the inward end of sleeve 162 are a plurality of blades 171 and 172. Blades 171 and 172 are pivotally secured within longitudinal slots 173 and 174, respectively, provided in the inward end of sleeve 162. Blade 171 is secured within slot 173 by a hinge pin 175, as may best be seen in FIGURE 9. Blade 172 is similarly secured within slot 174 by hinge pin 176. Connected between blades 171 and 172 is a spring 177. Spring 177 functions to maintain the blades in a retracted position until expanded into operating position as will be explained hereinafter. Mandrel 180 is positioned within sleeve 162 such that it may be rotated relative to the sleeve and moved longitudinally relative to the sleeve. The mandrel is provided with a head or enlarged portion 181 and a stem or portion of reduced diameter 182 which extends through portion 164 of sleeve 162. Stem 182 is threaded along a portion of its length to permit engagement with the internally threaded portion 164 of sleeve 162. Because of the threads provided on stem 182, rotation of the mandrel relative to sleeve 162 causes the mandrel to move longitudinally with respect to the sleeve. The outward end of the mandrel, that is the end of the mandrel opposite head 181, is provided with a hexagon-shaped external surface to permit engagement of a wrench or other suitable tool for rotating the mandrel. A packing nut 185 provided with internal packing 186 is secured to portion 164 of sleeve 162 around stem 182 to prevent leakage around the stem.

The positions of blades 171 and 172 and mandrel 180 during the time that the flange cleaning device is being introduced into the apparatus of FIGURES 1–7 is illustrated in FIGURE 8 by broken lines. It may be observed that the mandrel is retracted outwardly to the point where blades 171 and 172 are pulled inwardly by spring 177 so that the blades may be readily inserted through the valve and spool arrangement. The broken-line outline of the blades illustrates the retracted, or inward, position of the blades during insertion. The solid-line illustration of the mandrel and the blades shows that when the mandrel is extended into sleeve 162 the blades are pushed outwardly into cutting or cleaning position by the mandrel. The blades are held in cutting position by the outside surface of head 181 of the mandrel. The procedure of introducing the cleaning device into the valve interchange apparatus, expanding the blades into cutting position, and the actual operation of cleaning the gasket face of flange 6 will be explained hereinafter in connection with the operational description of the invention.

It is to be understood that rod 160 may be utilized to perform the function of compression rod 136 if so desired. If rod 160 is to be employed in lieu of compression rod 136, it is necessary to remove sleeve 162 and its associated cutting blades 171 and 172, along with mandrel 180. With these various parts removed, rod 160 may satisfactorily function as a compression rod. If this is done, however, it is necessary that packing nut 165 be replaced with a similar packing nut which has a solid face which will cover and thus enclose the bore of portion 161 of rod 160 in order to prevent the loss of fluids and pressure through the rod.

The operation of the invention may be broadly divided into six steps. In the first step, blind-flange plate 92 is secured to blind flange 7 which is on the end of a pipe 5 in which there is liquid or gas pressure. The second step involves the installation of half-cylinders 20 and 21 over the flange 6 of pipe 5 and the connection of spool 8 and valve 9 to the cylinder by means of piston 22, jack plate 131, tension rods 132, and the compression rod 136. In the third step, blind flange 7 is disengaged from flange 6 and retracted into pocket 79 by means of plate 92 and retracting rod 84. The fourth step comprises utilizing the apparatus of FIGURES 8 and 9 to clean the gasket surface of flange 6. In carrying out the fifth step, spool 8 and the valve 9 are positioned so that flange 10 on the spool may be secured to flange 6. The sixth and final step involves the removal of all parts of the tool from flange 6, spool 8, and valve 9.

Prior to the actual beginning of the first step in the operation, it is necessary that blind flange 7 be properly prepared to receive plate 92. Flange 7 is drilled and tapped along its center line to a depth sufficient to accommodate cap screw 100. Flange 7 may require grinding around its edges and along its face to remove forge marks and burrs to insure proper contact with recess 101 in plate 92. Flange 6 should be ground on its edge to insure contact with the inside surface of cylinder 19. The edge of flange 6 may, if desired, be provided with a shallow groove to receive packing 41 and 65. Flange 7 normally will be connected to flange 6 by stud bolts which extend through the flanges to secure them together. These stud bolts are removed one by one and replaced with hexagon-head machine bolts which are inserted through the flanges such that the heads of the bolts are on the side of flange 6. Hexagon-shaped nuts are turned onto each of the machine bolts and so positioned that they will register with the recesses 102 in plate 92. The removal of the studs and the insertion of the machine bolts one at a time is necessary in order that the fluid or gas within pipe 5 will not leak out between flanges 6 and 7. Plate 92 is placed over blind flange 7 and secured in position by means of cap screw 100.

Subsequent to placing plate 92 on blind flange 7, fingers 104 should be inserted to grasp the gasket material between flanges 6 and 7. The fingers are held in position by set screws 105. This will assist in sliding the gasket material off of flange 6 coincident with the removal of blind flange 7.

The seceond step in the operation is begun by installation of upper half-cylinder 20 and lower half-cylinder 21 around plate 92. Flange 31 is secured to flange 60, and flange 32 is secured to flange 61. It may be necessary to place gasket material between the flanges to prevent leakage of the liquid or gas contained within pipe 5. The flanges are held together by bolts 33 introduced through the holes provided in the flanges. Retracting rod 84 is inserted through sleeve 85 into pocket 79 and secured at its upper end into the lower end of plate 92. Spool 8 and valve 9, which have previously been secured together by flanges 11 and 12 to form a unitary structure, may now be placed in position for installation. A gasket 150 is installed on flange 10 and held in place by small pins or set screws 151. The upper and lower halves of piston 22 are placed around spool 8 such that flange 10 on the spool will rest within recess 113 of the piston. The halves of the piston are secured together by bolting flanges 110 to flanges 111. Prior to actually placing the flange of the spool within recess 113, hexagon-shaped nuts 115 are placed within recesses 114. The function of these nuts will be explained hereinafter. Piston 22 along with spool 8 are introduced into cylinder 19 until recess 124 and packing ring 125 are well within the cylinder.

Piston 22 and spool 8 should not be inserted into the cylinder so far that the spool flange 10 will come in contact with plate 92 inasmuch as plate 92 must be moved into pocket 79 to get flange 7 out of the way and to permit the connection of the spool flange 10 to flange 6. With piston 22 in position, packing rings 41, 125, and 122 may be tightened by means of their respective set screws. Tension rods 132 are inserted into lugs 30 and 75 on the cylinder. Jack plate 131 is installed on valve 9. This installation is accomplished by introducing sleeve 135 into the valve as shown in FIGURE 1 and securing the jack plate on the tension rods by means of nuts 134. Compression rod 136 is introduced into sleeve 135. The valve disk 14 in valve 9 must be retracted upwardly as illustrated in FIGURE 1 in order to provide clearance for the compression rod to pass through the valve and spool.

The third stage of the operation is the actual removal or retraction of blind flange 7 into pocket 79. Compression rod 136 is moved through the valve and spool until the inward end of the compression rod is in contact with plate 92. The compression rod and nuts 134 on tension rods 132 are respectively adjusted until the end of the compression rod has exerted a sufficient pressure on plate 92 to maintain blind flange 7 in fluid-tight contact with flange 6 while the bolts holding flanges 6 and 7 together are removed. The force which the compression rod exerts in order to maintain this fluid-tight relationship may be readily calculated and the necessary tension on rods 132 and compression on rod 136 may be obtained by using torque wrenches to adjust nuts 134 and the compression rod. Blind flange 7 may now be disconnected from flange 6 by removing through holes 44 and 73 the machine bolts holding the flanges together. Plugs 45 are inserted into holes 44 and 73 to prevent leakage through the holes until flanges 10 and 6 are permanently secured together. Plugs 45 are of an expanding type to insure a pressure-tight seal in the holes in flange 6. It will be noted that the hexagon-shaped nuts on the bolts holding flanges 6 and 7 together remain within recess 102 in plate 92. With all of the machine bolts connecting flanges 6 and 7 removed and plugs 45 properly in position, flange 7 is ready for removal. Compression rod 136 is retracted until it is no longer in contact with plate 92. The retraction of the compression rod should be performed slowly to permit a gradual bleeding of the pressure within pipe 5 into the cylinder. It will be recognized that with the compression rod retracted, there no longer being any connection between flanges 6 and 7, the pressure within pipe 5 will tend to urge flange 7 along with plate 92 away from the end of the pipe. After a few moments, the pressures within the cylinder and pipe 5 will become equalized and blind flange 7 may be retracted into pocket 79. Plate 92 is pulled into pocket 79 by means of retracting rod 84 and thus carries with it blind flange 7.

The fourth stage of the operation involves the cleaning of the gasket surface on flange 6 in order to insure proper contact between gasket 150 and flange 6 when flange 113 is moved into position and secured to flange 6. This cleaning operation is carried out by means of the apparatus shown in FIGURES 8 and 9. First, it is necessary to remove compression rod 136 from the spool and valve assembly. During the retraction of the compression rod, valve disk 14 must be moved downwardly into seated or closed position when the inward end of the compression rod has passed through valve seat 15 in order to contain the pressure being exerted by the fluid or gas within pipe 5. With the compression rod removed, the cleaning apparatus may be introduced into the spool and valve arrangement. Prior to actual introduction of the cleaning apparatus, it is necessary that blades 171 and 172 be in completely retracted position. This is accomplished by rotation of mandrel 180 until the head of the mandrel is retracted into sleeve 162 a sufficient distance to permit spring 177 to pull the blades inwardly sufficiently that the blades will amply clear the internal threads within sleeve 135. The cleaning apparatus is introduced into the valve-spool arrangement through sleeve 135 in the same manner as was compression rod 136. Rod 160 is rotated until the cleaning apparatus, or rather the inward end of sleeve 162, is estimated to be positioned within cylinder 19 between flanges 113 and 6. At this point the blades 171 and 172 may be expanded outwardly into actual cleaning position. Moving the blades into the proper position for cleaning may be done in several ways, such as by placing a mark on the rod 160 which would indicate when it has been introduced into the spool and valve arrangement a sufficient distance to place its inward end approximately at the middle point between flanges 6 and 113. The blades are then expanded into cleaning position by rotation of mandrel 180 by means of a wrench placed on the hexagon-shaped, exposed end of the mandrel. This rotation of the mandrel causes it to move relative to sleeve 162 and force the blades outwardly into the position shown by the solid-line representation of the blades in FIGURES 8 and 9. With the blades in expanded position, rod 160 is rotated until by means of feel it is ascertained that the blades are resting against the gasket surface of flange 6. The blades are then rotated to clean this gasket surface by means of a wrench placed on the hexagon-shaped section of portion 164 of sleeve 162. The blades should be rotated a number of times in order to assure obtaining a clean gasket surface on flange 6. When the cleaning operation is completed, rod 160 is rotated in order to move the blades back a short distance from flange 6 to permit their retraction. Mandrel 180 is then rotated to retract it into sleeve 162 to permit spring 177 to pull blades 171 and 172 inwardly in order that the cleaning apparatus may be removed. The cleaning apparatus is removed by retraction of rod 160. After removal of rod 160, rod 136 may be reinserted. If so desired, however, the interchange of the cleaning apparatus and the compression rod may be eliminated at this point and the cleaning apparatus left within the spool and valve arrangement. Preferably the cleaning apparatus is left in position inasmuch as neither the compression rod nor the cleaning apparatus performs any further function other than to contain the fluid pressure until the securing of flange 10 to flange 6 is completed.

The fifth stage in the operation is the securing of spool flange 10 to flange 6. Piston 22 is moved into cylinder 19 until the spool flange is in contact with flange 6 as shown in FIGURE 2. Nuts 134 on the tension rods are adjusted so that there will be sufficient force on gasket 150 between the spool flange and flange 6 to contain the pressure within pipe 5. Valve 81 is employed to bleed the pressure within the cylinder and gasket to atmospheric and plugs 45 are removed from holes 44 and 73. Machine bolts are inserted through holes 44 and 73, flange 6, and spool flange 10 and screwed tightly into the hexagon-shaped nuts 115 resting within recesses 114 in piston 22. The machine bolts are tightened until they are exerting sufficient force between the spool flange and flange 6 to contain the pressure within pipe 5.

The sixth and last stage comprises the removal of the apparatus of the invention from both flange 6 and the spool and valve arrangement. This may now be carried out since the spool flange has been securely attached to flange 6. Compression rod 136, or rod 160 if it has been left in position, is retracted until its inward end is past the valve seat 15 and the valve disk 14 is lowered until it is in sealed relationship with the valve seat, thus providing the means for containing the fluid or liquid within the spool and valve. The compression rod is removed from jack plate 131 and the jack plate is taken off the tension rods by disconnection of nuts 134 from the tension rods. The tension rods are unscrewed from lugs 30 and 75. The upper and lower halves of cylinder 19 are disconnected from each other and removed. Inasmuch as plate 92 along with blind flange 7 are resting within pocket 79, it is not necessary in order to disassemble the cylinder that the retracting rod 84 be unscrewed from plate 92, though if desired it may be done. Cylinder 22 is now removed from the spool by disconnection of upper half 23 from lower half 24. It may be necessary, and certainly desirable, in the removal of both the cylinder and the piston that the valve packing rings be loosened in order that the operation may be more easily accomplished. It will now be recognized that any additional piping may be readily connected to valve 9 at flange 13 inasmuch as the pressure within the system is now contained by virtue of the valve's being closed.

Though the device of the invention has been described in the light of the specific embodiment described herein, it will be recognized that modifications may be made in the shape of various parts in order to accommodate different forms of pipe and spool flanges. The device may be constructed for use with any size pipe and flange.

It is intended that the invention be limited only within the scope of the appended claims.

What is claimed is:

1. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, means including a blind flange plate operatively associated with said split-cylinder and adapted to be secured over said blind flange for removing said blind flange from said flanged pipe end, piston means securable around said spool and insertable into said split-cylinder, and means securable to said split-cylinder for supporting said spool and valve assembly and moving said assembly into position for securing to said flanged pipe end.

2. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, each of said half-cylinders being provided with internally threaded lugs secured to the outer surfaces thereof, a pocket secured to and opening into said lower half-cylinder, a blind flange plate movably secured within said split-cylinder and adapted to be assembled over said blind flange and retracted into said pocket, piston means securable around said spool and insertable into said split-cylinder, and means securable to said lugs on said half-cylinders for supporting said spool and valve assembly and moving said assembly into position for securing to said flanged pipe end.

3. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, each of said half-cylinders being provided with internally threaded lugs secured to the outer surfaces thereof, a pocket secured to and opening into said lower half-cylinder, a blind flange plate movably secured within said split-cylinder and adapted to be assembled over said blind flange and retracted into said pocket, piston means securable around said spool and insertable into said split-cylinder, means securable to said lugs on said half-cylinders for supporting said spool and valve assembly and moving said assembly into position for securing to said flanged pipe end, and means including a rod provided with movable blades insertable through said spool and valve assembly for removing gasket material from said flanged pipe end.

4. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, each of said half-cylinders being provided with internally threaded lugs secured to the outer surfaces thereof, a pocket secured to and opening into said lower half-cylinder, a blind flange plate movably secured within said split-cylinder and adapted to be assembled over said blind flange and retracted into said pocket, a split-piston comprising an upper half-piston and a lower half piston adapted to be assembled over said spool and inserted into said split-cylinder, one end of said split-piston having a recess for receiving a flange on said spool, and means including tension rods insertable into said lugs and a jack plate supportable on said tension rods for supporting said spool and valve assembly and moving said assembly into said position for securing said assembly to said flanged pipe end.

5. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, each of said half-cylinders being provided with internally threaded lugs secured to the outer surfaces thereof, a pocket secured to and opening into said lower half-cylinder, a blind flange plate movably secured within said split-cylinder and adapted to be assembled over said blind flange and retracted into said pocket, a split-piston comprising an upper half-piston and a lower half-piston adapted to be assembled over said spool and inserted into said split-cylinder, one end of said split-piston having a recess for receiving a flange on said spool, tension rods insertable into said lugs on said half-cylinders, a jack plate securable on said tension rods, said jack plate being adapted to be secured to a flange on said valve, an internally threaded sleeve secured through said jack plate and adapted to be inserted into said valve, and an externally threaded compression rod insertable through said sleeve.

6. In a pipe tool for removing a blind flange from a flanged pipe end and installing an assembly comprising a spool and valve on said flanged pipe end, the combination which includes a split-cylinder which comprises an upper half-cylinder and a lower half-cylinder adapted to be assembled over said blind flange and said flanged pipe end, each of said half-cylinders being provided with internally threaded lugs secured to the outer surfaces thereof, a pocket secured to and opening into said lower half-cylinder, a blind flange plate movably secured within said split-cylinder and adapted to be assembled over said blind flange and retracted into said pocket, a split-piston comprising an upper half-piston and a lower half-piston adapted to be assembled over said spool and inserted into said split-cylinder, one end of said split-piston having a recess for receiving a flange on said spool, tension rods insertable into said lugs on said half-cylinders, a jack plate securable on said tension rods, said jack plate being adapted to be secured to a flange on said valve, an internally threaded sleeve recured through said jack plate and adapted to be inserted into said valve, an externally threaded compression rod insertable through said sleeve, and means including a rod provided with movable blades interchangeable with said compression rod and adapted to remove gasket material from said flanged pipe end.

7. In a pipe tool for removing a blind flange from a flanged pipe end and installing an assembly comprising a spool and valve on said flanged pipe end, the combination which includes a split-cylinder which comprises an upper half-cylinder and a lower half-cylinder, each of said half-cylinders being provided with flanges to permit said half-cylinders to be secured together over said blind flange and said flanged pipe end, a plurality of internally threaded lugs secured on the outer surface of each half-cylinder, the longitudinal axes of said lugs being parallel to the longitudinal axis of said split-cylinder, packing means within each of said half-cylinders to effect a seal around said flanged pipe end, an inwardly extending flange on an end of each of said half-cylinders, each of said inwardly extending flanges being provided with openings to permit the removal and introduction of bolts through said flanges, a box-shaped pocket secured to and opening into said lower half-cylinder, a retracting rod movably secured through the bottom of said pocket, a blind flange plate secured to the end of said retracting rod within said pocket and lower half-cylinder, means associated with said pocket and said blind flange plate for maintaining said plate in alignment while said plate is being retracted into said pocket, said blind flange plate being provided with a recess adapted to receive said blind flange to permit said blind flange to be retracted into said pocket by said blind flange plate, said blind flange plate being further provided with a plurality of recesses opening into said last-mentioned recess each of which is adapted to receive a nut, a split-piston comprising an upper half-piston and a lower half-piston each of which is provided with flanges to permit assembly of said split-piston over said spool, said split-piston being insertable into said split-cylinder, one end of said split-piston being provided with a recess adapted to receive a flange on said spool, said split-piston being further provided with a plurality of recesses opening into said last-mentioned recess, each of said recesses being adapted to receive a nut, packing means on the inside surface of said split-piston for effecting a seal between said piston and said spool, packing means around the outside surface of said split-piston for effecting a seal between said split-piston and the internal surface of said split-cylinder, a plurality of externally threaded tension rods, each of which is adapted to be inserted into one of said lugs, a jack plate securable on said tension rods, said jack plate being provided with a plurality of holes to permit said plate to be secured to a flange on said valve, an internally threaded sleeve secured through said jack plate, and an externally threaded compression rod adapted to be inserted through said sleeve in said jack plate.

8. In a pipe tool for removing a blind flange from a flanged pipe end and installing an assembly comprising a spool and valve on said flanged pipe end, the combination which includes a split-cylinder which comprises an upper half-cylinder and a lower half-cylinder, each of said half-cylinders being provided with flanges to permit said half-cylinders to be secured together over said blind flange and said flanged pipe end, a plurality of internally threaded lugs secured on the outer surface of each half-cylinder, the longitudinal axes of said lugs being parallel to the longitudinal axis of said split-cylinder, packing means within each of said half-cylinders to effect a seal around said flanged pipe end, an inwardly extending flange on an end of each of said half-cylinders, each of said inwardly extending flanges being provided with openings to permit the removal and introduction of bolts through said flanges, a box-shaped pocket secured to and opening into said lower half-cylinder, a retracting rod movably secured through the bottom of said pocket, a blind flange plate secured to the end of said retracting rod within said pocket and lower half-cylinder, means associated with said pocket and said blind flange plate for maintaining said plate in alignment while said plate is being retracted into said pocket, said blind flange plate being provided with a recess adapted to receive said blind flange to permit said blind flange to be retracted into said pocket by said blind flange plate, said blind flange plate being further provided with a plurality of recesses opening into said last-mentioned recess each of which is adapted to receive a nut, a split-piston comprising an upper half-piston and a lower half-piston each of which is provided with flanges to permit assembly of said split-piston over said spool, said split-piston being insertable into said split-cylinder, one end of said split-piston being provided with a recess adapted to receive a flange on said spool, said split-piston being further provided with a plurality of recesses opening into said last-mentioned recess, each of said recesses being adapted to receive a nut, packing means on the inside surface of said split-piston for effecting a seal between said piston and said spool, packing means around the outside surface of said split-piston for effecting a seal between said split-piston and the internal surface of said split-cylinder, a plurality of externally threaded tension rods, each of which is adapted to be inserted into one of said lugs, a jack plate securable on said tension rods, said jack plate being provided with a plurality of holes to permit said plate to be secured to a flange on said valve, an internally threaded sleeve secured through said jack plate, an externally threaded compression rod adapted to be inserted through said sleeve in said jack plate, and means for removing gasket material from said flanged pipe and comprising a hollow externally threaded rod insertable through said internally threaded sleeve and interchangeable with said compression rod, an internal sleeve movably secured within said hollow rod, a plurality of axially movable blades pivotally secured within the inward end of said internal sleeve, and a mandrel movably secured within said internal sleeve and adapted to expand said blades into cutting position.

References Cited in the file of this patent

UNITED STATES PATENTS

| | | |
|---|---|---|
| 587,092 | French | July 27, 1897 |
| 1,174,342 | O'Brien | Mar. 7, 1916 |
| 1,885,593 | Downer | Nov. 1, 1932 |
| 2,250,244 | Yancey | July 22, 1941 |
| 2,349,889 | Steudel | May 30, 1944 |
| 2,350,998 | Beach | June 13, 1944 |